United States Patent Office 2,769,772
Patented Nov. 6, 1956

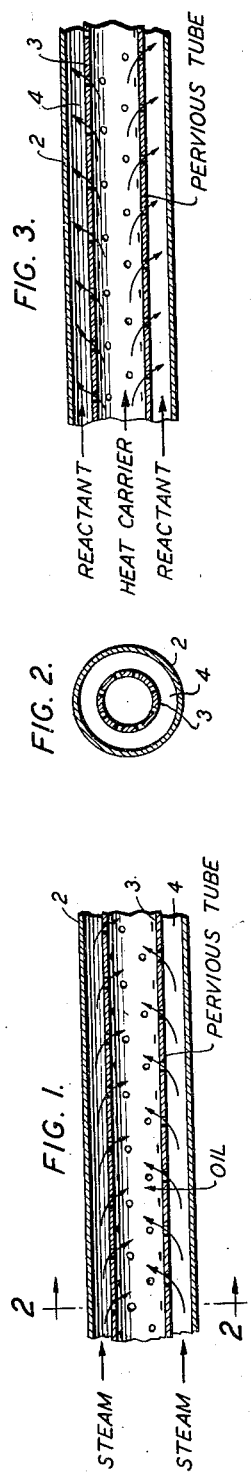
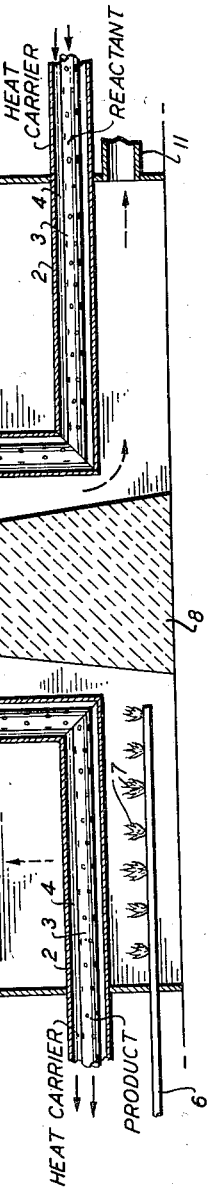

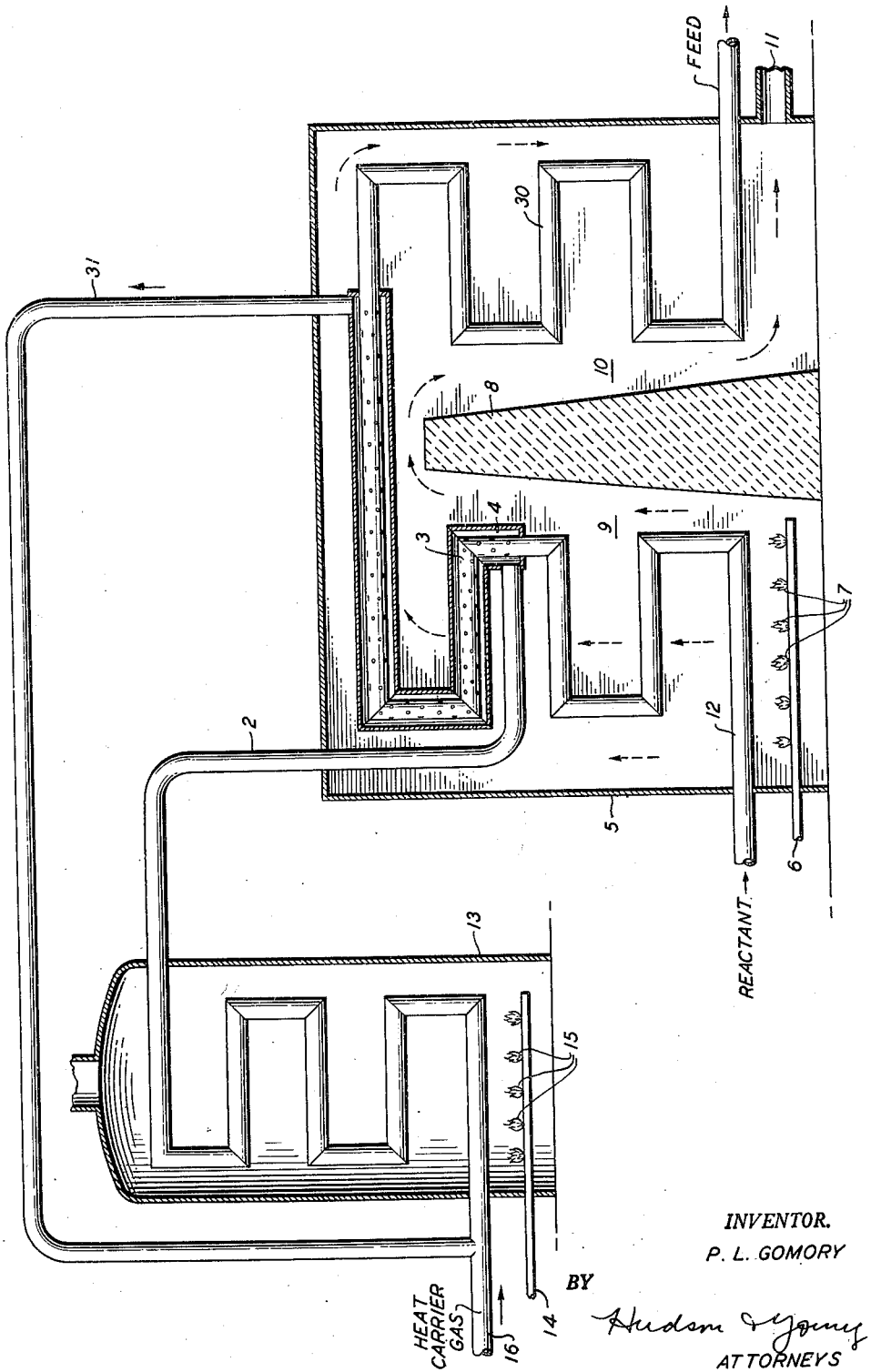

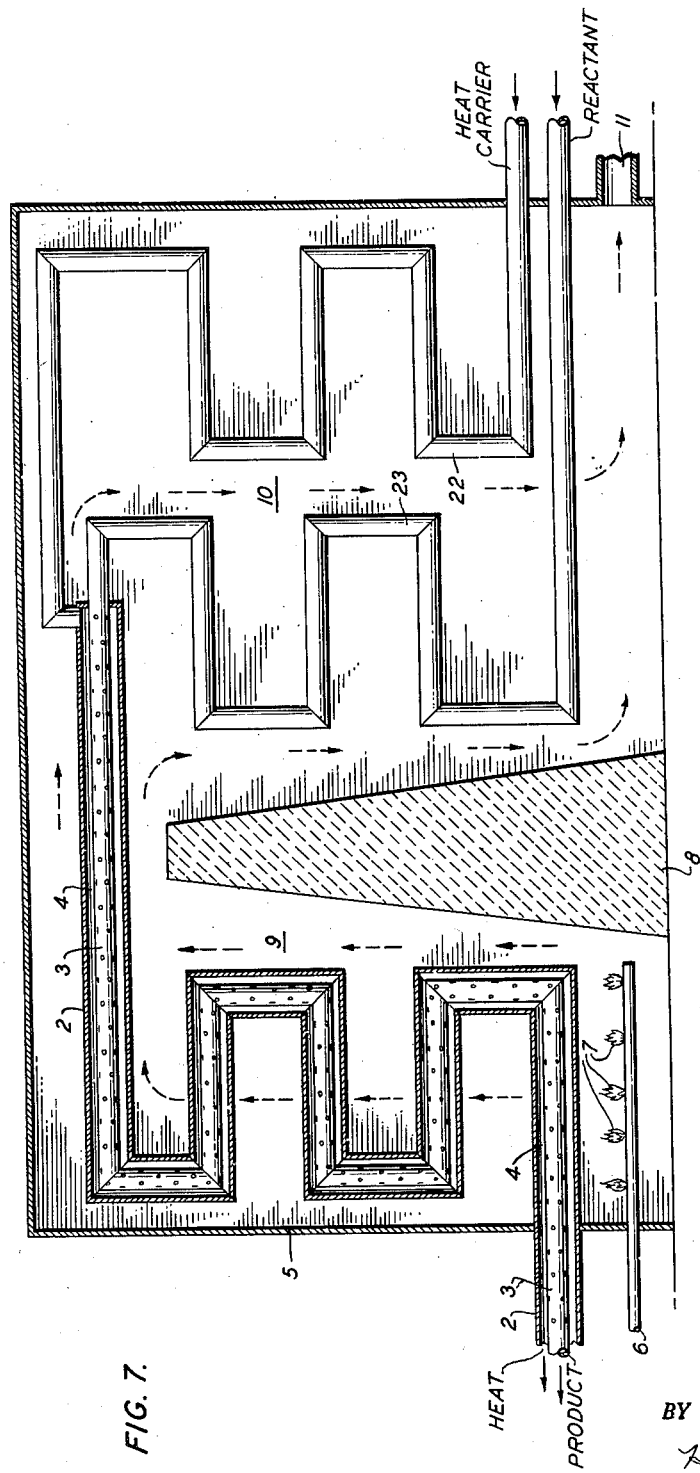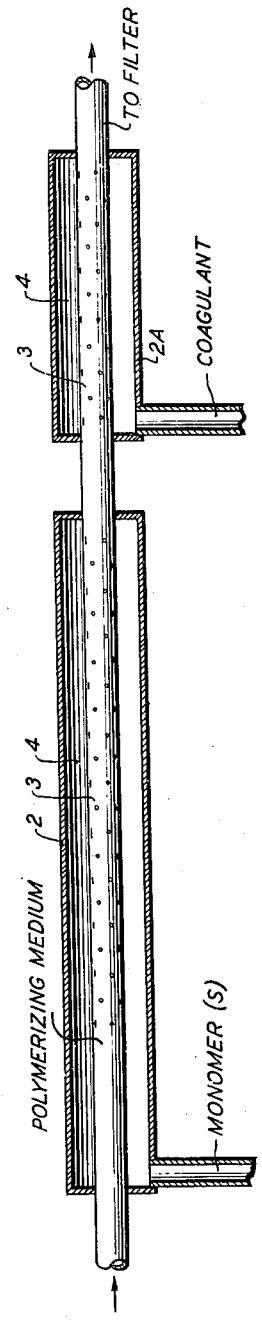

2,769,772

PROCESS AND APPARATUS FOR HANDLING OF CARBONACEOUS OR REACTANT MATERIALS

Paul L. Gomory, Bethesda, Md., assignor to Phillips Petroleum Company, a corporation of Delaware Application April 16, 1952, Serial No. 282,725

17 Claims. (Cl. 196—63)

This invention relates to the handling of carbonaceous or reactant materials. In one aspect it relates to the prevention of carbon deposition during the thermal conversion of carbonaceous materials. In another aspect it relates to the effecting of chemical reaction employing a novel method and novel means in combination to effect contacting of reactants.

In still another aspect the invention relates to the heating at a conversion temperature of carbonaceous materials, which form and throw out carbon or coke-like substances at said temperature, which substances ordinarily form an adherent mass upon the heating means, in a manner and under conditions such that the deposition of the said substances and the consequent formation of said adherent mass is avoided employing a novel combination of heating apparatus and heat carrying media. In another aspect the invention relates to the heating of a carbonaceous material in a plural-walled passageway at least one wall of which is pervious to a heat carrying medium.

In another aspect the invention relates to the thermal treatment of a hydrocarbonaceous material under coke-forming and depositing conditions but avoiding such deposition by flowing said hydrocarbonaceous material through a passageway, the walls of which are pervious to a heat carrying medium which is introduced into said material through said walls as described below. In a further aspect still, the invention relates to the short-time treatment of hydrocarbon oil, especially when it is in the vaporized state, at a very high temperature and then rapidly quenching the same by heating the same and then causing it to pass through a pervious tube into a fluid at a substantially lower temperature. In still another aspect the invention relates to the effecting of reactions in which intimate contact of reactants is to be accomplished in a very short time to avoid undue heat, or cooling, or undesired side reactions. In a further aspect still, the invention relates to a novel manner of preparing reaction products of hydrocarbon materials, for example synthetic rubbers or plastics.

One problem accompanying the heating or conversion of carbonaceous materials is that they tend to deposit carbon upon heating surfaces. When the process is one that is conducted at high temperatures, the deposition of carbon causes plugging of tubes and the development of hot spots in the tubes, which necessitate frequent interruptions of the process to replace damaged tubes. These difficulties are encountered in the high-temperature conversion of hydrocarbons. For example, in the thermal cracking or high-temperature heating of an oil, the oil tends to deposit carbon upon the surfaces of tubes in which the oil is heated. This carbon deposition is particularly marked at the point known as the dry point, at which the last few percent or few tenths of a percent of the oil is vaporized. Carbon deposition is often responsible for expensive shut-downs of processing equipment for the purpose of removing carbon from the tubes of the heating equipment or for replacing tubes that have become damaged by the formation of hot spots.

In the production of synthesis or other gaseous products, as a gas such as natural gas is subjected, at elevated temperature and under other suitable and known conditions, to partial oxidation to produce various ratios of carbon monoxide and hydrogen together with other reaction gases. The gaseous effluent must be rapidly quenched to a temperature at which the desired ratio of reaction products will not be changed by reversion or other undesired reaction, as is also now well known.

According to this invention there are provided, in combination, a means and a method for handling of a material which can be one of a carbonaceous and reactant material which comprises a plurality of passageways arranged one within the other and at least one of which is pervious, and the steps of passing a material through one of said passageways; passing another material which can affect the treatment of the material in said one of said passageways through adjacent passageway in proportion and under conditions to cause said another material to pass into said pervious passageway.

According to still another embodiment of the invention, a polymerizable monomer, such as butadiene can be passed continuously through a pervious passageway, adjacent and in communication with another passageway containing a polymerizing medium, and caused to pass into said polymerizing medium in a manner and under conditions set forth and described below.

The pervious passageway can be a tube and can be porous or perforate. The tube can be constructed of porous porcelain or silicon carbide or it may be constructed of metal and perforated or be made of a sintered metal powder.

According to one embodiment of the invention, a hydrocarbon is cracked by passing it through a pervious tube surrounded by a heat carrier, such as steam. The steam is maintained at a higher pressure than the hydrocarbon and thus diffuses through the pervious tube and prevents carbon deposition on the interior of the tube. The steam can be used as the sole heat-imparting material for the cracking or additional heat may be added from other sources. Alternatively, a refractory hydrocarbon material, such as a recycle gas oil can be used as the heat carrying material.

According to another embodiment of the invention, a hydrocarbon can be subjected to hydroforming by passing the hydrocarbon through a pervious tube surrounded by hydrogen, which acts as the heat carrier. The hydrogen diffuses through the tube and mingles and reacts with the hydrocarbon inside the pervious tube. The diffusion of the hydrogen through the tube prevents or minimizes carbon deposition on the interior of the tube.

According to another embodiment of the invention, methane can be converted to synthesis gas by passing the methane through a pervious tube surrounded by a heat carrier, which can be carbon dioxide, oxygen, and/or steam. The carbon dioxide, oxygen, and/or steam passes through the pervious tube, reacts with the methane to form synthesis gas, and at the same time prevents carbon deposition on the surface of the tube by reaction with any carbon which may be forming on the surface of the tube. After the desired reaction is effected, the travelling gases in the pervious tube reach a place at which the tube is surrounded by a quench medium and the medium is caused to enter into and commingle with the travelling gases, or vice versa, thus to secure immediate quench in a fraction of a second.

According to another embodiment of the invention, a hydrocarbon oil can be subjected to polyforming by passing the oil through a pervious tube surrounded by a lighthydrocarbon such as propane, butane, propylene or butylene, which diffuses through the tube, carries heat to the hydrocarbon oil, and reacts with the hydrocarbon oil by the well-known polyforming reactions.

According to another embodiment of the invention, a heavy polymer can be subjected to depolymerization by passing the polymer through a pervious tube surrounded by steam or inert gas, which acts as a heat carrier. The diffusion of the heat carrier through the tube minimizes the deposition of carbon on the interior of the tube.

According to still another embodiment of the invention, a polyalkylated aromatic hydrocarbon can be dealkylated by passing the polyalkylated aromatic through the interior of the previous tube, passing a non-alkylated aromatic hydrocarbon, such as benzene along the outside of said tube and causing the benzene to diffuse into the interior of the pervious tube to react with the polyakylated aromatic by the well-known alkyl group exchange reaction and thus minimizing the deposition of carbon on the interior of the tube.

Figure 1 of the drawings is a longitudinal section of a heating tube constructed in accordance with the present invention. Reactant material, such as oil passes through the interior of pervious tube 3, which is coaxial with tube 2 of larger diameter. In this embodiment tube 2 is non-pervious. Steam or other heat carrier flows through annulus 4 and diffuses as indicated by the arrows into the interior of pervious tube 3. The steam is supplied to annulus 4 at a high temperature and at a pressure higher than that of the reactant in tube 3. The steam diffuses through the walls of pervious tube 3 and into the reactant material inside tube 3. The steam in passing through the pervious tube prevents the deposition of carbon on the surface of said tube.

Figure 2 is a transverse cross section of the apparatus shown in Figure 1. In the embodiment shown in Figure 3 the heat carrier is supplied to the interior of pervious tube 3, and passes outward through the walls of tube 3 into annulus 4 to which the reactant material is supplied. Tube 2 is non-pervious. Additional heat can be supplied to the reactant in annulus 4 through tube 2 if desired. Ordinarily the temperature immediately outside tube 2 will be lower than the temperature of the heat carrier supplied to the interior of pervious tube 3. Thus, deposition of carbon on the walls of non-pervious tube 2 will be eliminated or prevented.

In the embodiment shown in Figure 4 inner pervious tube 3 is coaxial with outer pervious tube 3A. A high-temperature heat carrier is supplied to the interior of tube 3 and a lower-temperature heat carrier is supplied to the outside of tube 3A. Heat carrier from the outside of tube 3A and from the inside of pervious tube 3 diffuses into annulus 4, there mingling with the reactant and preventing the deposition of carbon on the inner and outer walls of annulus 4.

The apparatus of Figures 1 through 4 can also be used to quench a hot gas by flow of cold quench medium into said gas or vice versa.

Figure 5 shows a cracking furnace which utilizes a pervious tube inside a non-pervious tube in accordance with this invention. Tube coil 3 is pervious and is placed inside non-pervious tube 2, thus forming annulus 4 between the two tubes. Furnace 5 comprises radiant section 9 and convection section 10 between which is refractory wall 8. Gas inlet 6 is supplied with burner 7. A fuel gas such as natural gas is burned inside radiant section 9. The flow of combustion gases is indicated by the dotted arrows. Combustion gases leave furnace 5 through outlet 11 and pass to a stack not shown.

Reactant material such as oil passes into pervious tube coil 3 and through both sections 9 and 10 of furnace 5. Products of the thermal reaction are withdrawn from pervious tube 3 on the opposite side of the furnace and passed to separation and recovery means not shown. Heat carrier, which may be preheated, is passed into annulus 4 and through both sections of the furnace, being withdrawn on the opposite side. Part of the heat carrier diffuses through porous tube 3 and mingles with the reactants. In radiant section 9 of furnace 5 the heat carrier absorbs heat directly through the walls of non-pervious tube 2. Since annulus 4 is filled with heat carrier, the heat carrier insulates the reactant from the direct action of radiant energy in section 9. By the insulating action and by the effect of the passage of the heat carrier through the walls of pervious tube 3, deposition of carbon on the walls of tube 3 is minimized. When section 10 of furnace 5 is used as a soaking section, in a thermal cracking process, the deposition of carbon on the walls of tube 3 is minimized by the continued passage of heat carrier through the walls of pervious tube 3.

Figure 6 shows another embodiment of the invention having added flexibility. Reactant material passes into tube coil 12 in radiant section 9 of furnace 5. In this coil the reactant is preheated, by the combustion of gas supplied through 6 to burner 7, to a temperature at which coking begins. Preheated reactanct passes from tube coil 12 into pervious tube coil 3. Heat carrier gas is separately heated in furnace 13 by combustion of gas supplied to inlet 14 to burners 15. The heat carrier enters tube coil 16 and is heated to any desired temperature, which may be higher than the temperature of furnace 5. Heated carrier gas passes from tube coil 16 to coil 2 and comes into contact with pervious coil 3 at a point where coking would ordinarily begin. The heated carrier gas passes from annulus 4 through the walls of pervious tube 3 and mixes with the reactant material in pervious tube 3, preventing the formation of coke. Heat carrier is withdrawn through conduit 31 and recycled to furnace 13 after it has performed its function, and the reactant material has entered non-pervious coil 30 in which coke-forming conditions are not present. By separately heating carrier gas, according to this embodiment of the invention, added flexibility of the process is attained. The carrier gas can be heated to any desired temperature, which need not be the temperature of either section 9 or section 10 or furnace 5, but may, if desired, be a much higher temperature. This mode of operation provides for extreme temperature heating of a reactant by means of a heat carrier gas without the severe carbon deposition which would be obtained in prior methods of heating.

Figure 7 illustrates a further embodiment of the invention in which the features of Figures 5 and 6 are combined. As in those figures, furnace 5 is provided with a refractory wall 8 which divides the furnace into radiant section 9 and convection section 10. Fuel inlet 6, with burners 7, and stack outlet 11 are also provided. Reactant enters the furnace through coil 23 in convection section 10 and then passes into pervious tube 3 in radiant section 9. Reaction products are withdrawn from the radiant side of the furnace. Heat carrier enters coil 22 in section 10 and passes into annulus 4 in radiant section 9. The heat carrier diffuses through pervious tube 3, as previously described. Excess heat carrier is withdrawn through annulus 4 on the radiant side. In this embodiment, convection section 10 serves to preheat the reactant or reactants and heat carrier. The relative temperatures of the reactant and heat carrier may be adjusted by varying the lengths and/or diameters of coils 22 and 23. Further control can, of course, be obtained by adjusting the relative flow rates through coils 22 and 23. By thus adjusting the residence time in each of said coils, the desired preheating of heat carrier and of reactant or reactants can be obtained.

Figure 8 shows an embodiment in which a polymerizable monomer, such as butadiene and/or styrene is polymerized. One or more monomers flows through the annular passage between pervious tube 3 and non-pervious tube 2. A polymerizing medium flows through tube 3. The monomer or monomers pass through pervious tube 3 into the polymerizing medium and are there polymerized. Flow velocities are such that no mechanical stirring is needed, turbulence providing the necessary agitation. The pressure in annular passage 4 is sufficient to force the monomer or monomers through pervious tube 3 into the interior thereof. When emulsion polymerization is desired, the polymerizing medium can be a soap solution containing a polymerization catalyst such as a peroxide. When polymerization from solution is desired the polymerizing medium can be a suspension of an aluminum halide in an inert hydrocarbon. A coagulant, such as sulfuric acid is added to tube 2A and passes into the interior of porous tube 3 to coagulate polymer. The coagulated and polymerized material is passed from tube 3 to filtration or other recovery means not shown.

Variation and modification are possible within the scope of the specification and claims to this invention, there is provided a means and a method for handling a carbonaceous or reactant material which means comprises a plurality of passageways arranged one within the other and at least one of which is pervious; and which method comprises passing a material through one of said passageways, passing another material, which can affect the treatment of the first-mentioned material, through an adjacent passageway under conditions to cause said other material to pass into said pervious passageway. As an example of such variation and modification, said other or heat carrying material can be made to flow through an adjacent passageway of diminishing cross-section corresponding to the diminishing volume of said material in said passageway.

I claim:

1. In a process in which a stream of carbonaceous reactant is passed through a heating zone heated by radiant heating, the steps of surrounding said stream with a heat-carrying medium over a substantial length of passage of said stream through said zone, imparting heat to said medium in said zone over a substantial length of said stream and simultaneously causing the heated medium to pass into said stream, also over a substantial length thereof.

2. In a process in which a stream of hydrocarbonaceous reactant is passed through a heating zone heated by radiant heating, said reactant being consequently chemically converted, the steps of surrounding said stream with an annular layer of fluid heat-carrying medium over a substantial length of passage of said stream through said zone, causing heat to flow into and through said layer of said medium from said zone over a substantial length of said stream, and simultaneously causing the heated medium to pass into said stream, also over a substantial length thereof.

3. A process according to claim 2 wherein the chemical conversion is cracking and the heat-carrying medium is selected from the group consisting of steam and a refractory hydrocarbon.

4. A process according to claim 2 in which the conversion is hydroforming and the heat-carrying medium is hydrogen.

5. A process according to claim 2 wherein said hydrocarbonaceous reactant is methane, the chemical conversion is the conversion of said methane to synthesis gas, and said heat-carrying medium is selected from the group consisting of oxygen, carbon dioxide and steam.

6. A process according to claim 2 wherein the chemical conversion is polyforming and said heat-carrying medium is selected from the group consisting of ethane, ethylene, propane, butane, butylene and propylene.

7. A process according to claim 2 wherein said hydrocarbonaceous reactant is a polyalkylated aromatic hydrocarbon, the chemical conversion is dealkylation of said hydrocarbon, and said heat-carrying medium is a nonalkylated aromatic hydrocarbon.

8. Heating apparatus comprising, in combination: two coaxial pervious tubes of different diameters, a space of generally annular cross-section between said tubes, means for supplying a reactant to said space, means for supplying fluid heat carrier to the interior of the tube of smaller diameter, and means for supplying a fluid heat carrier to the exterior of the tube of larger diameter, said tubes being encompassed within a substantially nonpervious outer shell.

9. Heating apparatus comprising in combination: a furnace comprising a radiant heating zone and a convection zone; an impervious soaking coil in said convection zone; an impervious preheat coil in said radiant heating zone; a pervious conduit between said soaking coil and said preheating coil and connecting the interiors of said coils with each other; a tube enclosing said conduit and forming an annular space around said conduit; a conduit communicating with said annular space; means for supplying reactant to said preheat coil; means for supplying a fluid heat carrier to said tube enclosing said pervious conduit; means, independent of said furnace, for supplying heat to said heat carrier; means for withdrawing reacted material from said soaking coil; and means for returning heat carrier from said tube to said means for supplying heat to said heat carrier.

10. The apparatus of claim 9 in which the walls of said pervious conduit are constructed of porous refractory material.

11. The apparatus of claim 9 in which the walls of said pervious conduit are of metal.

12. Apparatus according to claim 9 wherein said tube enclosing said conduit is a tube of diminishing cross-section in an axial direction.

13. Apparatus according to claim 9 wherein at least part of said pervious conduit is positioned within said radiant heating zone.

14. In a heating apparatus which includes a furnace containing a radiant heat section and a convection section, the improvement comprising, in combination: a pervious conduit positioned within a nonpervious conduit, both said conduits being positioned within said radiant heat section; means for withdrawing fluid from each of said conduits; a preheat conduit positioned within said convection section and in open and direct communication with said pervious conduit; and another preheat conduit positioned within said convection section, collaterally with respect to said first-mentioned preheat conduit, and in open and direct communication with said nonpervious conduit.

15. Apparatus according to claim 14 wherein said pervious conduit is made of porous refractory material.

16. Apparatus according to claim 14 wherein said pervious conduit is a perforate metal conduit.

17. Apparatus according to claim 14 wherein said nonpervious conduit has diminishing cross-section in the direction of flow of fluid therethrough.

References Cited in the file of this patent

UNITED STATES PATENTS

| Number | Name | Date |
|---|---|---|
| 200,482 | Salisbury | Feb. 19, 1878 |
| 200,938 | Salisbury | Mar. 5, 1878 |
| 389,567 | Hall | Sept. 18, 1888 |
| 477,153 | Pielsticker | June 14, 1892 |
| 968,172 | Luciani | Aug. 10, 1910 |
| 1,685,759 | Walter | Sept. 25, 1928 |
| 2,011,339 | Hillhouse | Aug. 13, 1935 |
| 2,064,486 | Miller | Dec. 15, 1936 |
| 2,206,189 | Hillhouse | July 2, 1940 |
| 2,312,719 | Kuhl | Mar. 2, 1943 |
| 2,391,818 | Brandt | Dec. 25, 1945 |
| 2,431,632 | Brandt | Nov. 25, 1947 |
| 2,472,844 | Munday et al. | June 14, 1949 |